United States Patent [19]

Battail et al.

[11] 4,328,582

[45] May 4, 1982

[54] BINARY DECODING DEVICE

[75] Inventors: Gérard Battail; Patrick Mollat du Jourdin, both of Paris, France

[73] Assignee: Thomson-CSF, Paris, France

[21] Appl. No.: 154,954

[22] Filed: May 30, 1980

[30] Foreign Application Priority Data

May 31, 1979 [FR] France .................. 79 13987

[51] Int. Cl.³ .................................... G06F 11/10
[52] U.S. Cl. ................................... 371/37; 371/43
[58] Field of Search ................ 371/37, 39, 40, 43, 371/44, 45

[56] References Cited

U.S. PATENT DOCUMENTS

| | | | |
|---|---|---|---|
| 3,805,236 | 4/1974 | Battail | 371/43 |
| 4,087,787 | 5/1978 | Acampora | 371/43 |
| 4,130,818 | 12/1978 | Snyder, Jr. | 371/43 |

Primary Examiner—Charles E. Atkinson

[57] ABSTRACT

In order to decode the bits of a message transmitted by an array of channels in parallel which have low reliability on account of the many disturbances which interfere with transmission, the binary decoding device comprises means for calculating the probability of error in each channel as a function of the coefficients of logarithmic likelihood of the decoded values and of the binary values received, as well as means for weighting the binary values received on each channel as a function of the calculated probability of error. In accordance with an optimum decision rule applied to the weighted values, a weighted decoding device delivers the binary values which are transmitted with the largest likelihood and the coefficients of logarithmic likelihood of these values.

4 Claims, 2 Drawing Figures

FIG_1
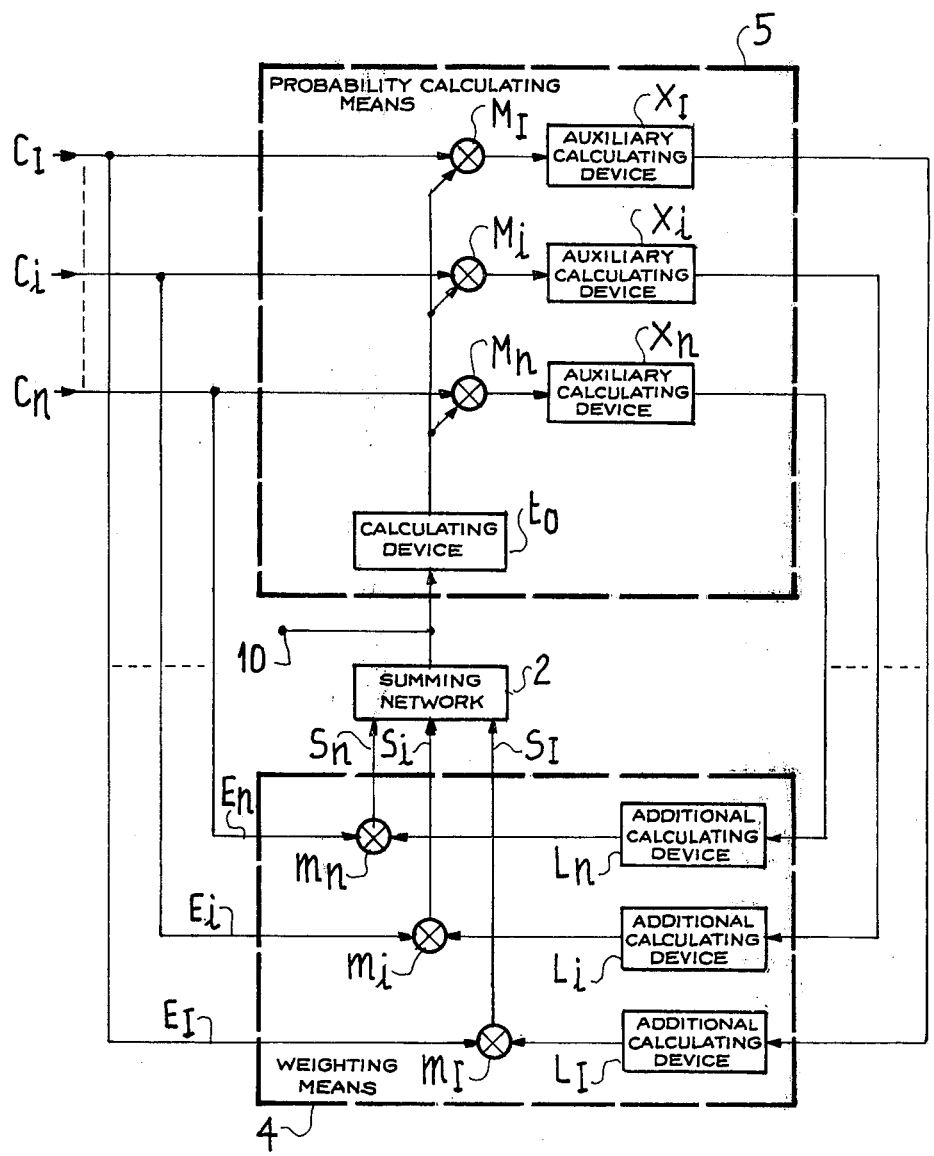

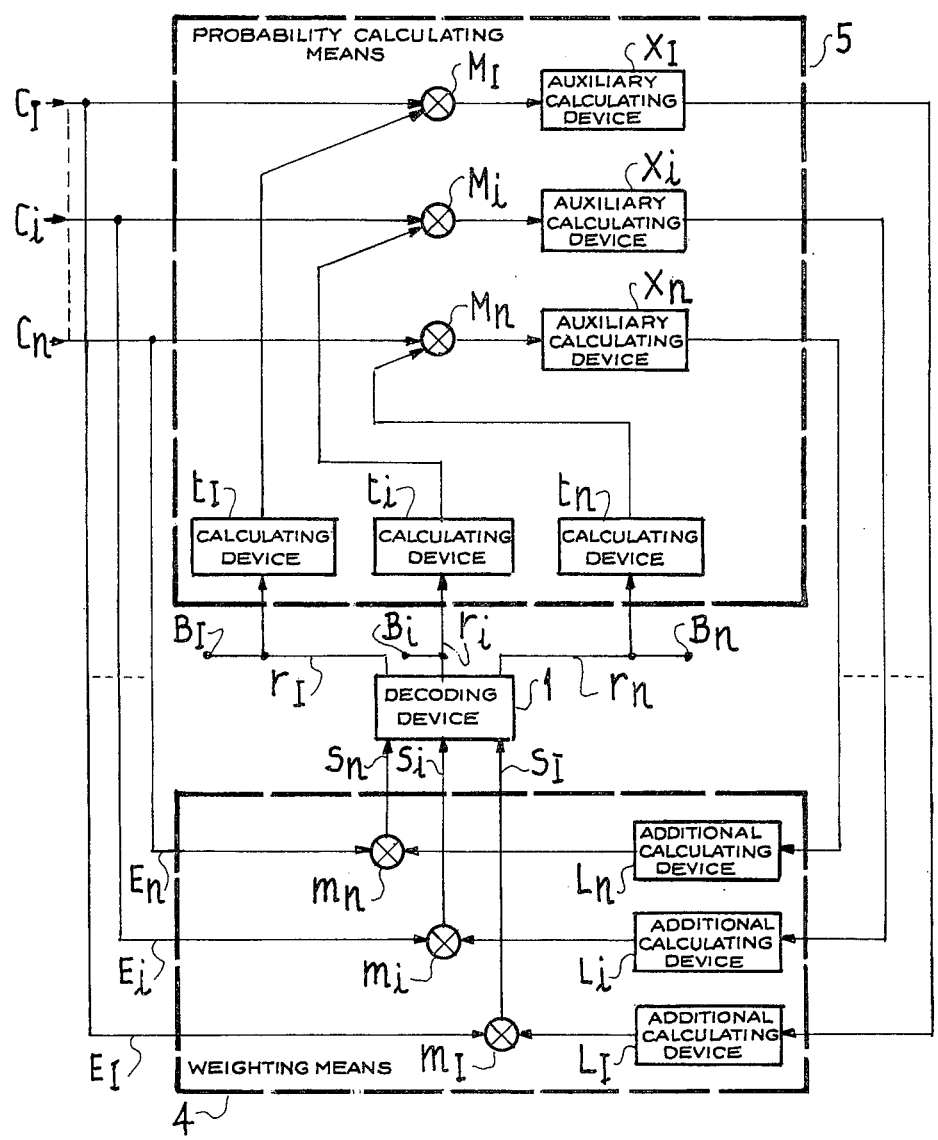
FIG_2

BINARY DECODING DEVICE

This invention relates to the decoding devices employed in binary data transmission systems comprising a series of channels in parallel which exhibit low reliability on account of the large number of disturbances which affect the transmission process.

In order to make a data message less vulnerable to transmission errors, each data item can be transmitted simultaneously on each channel. This is what we shall call transmission by repetition. Another method consists in converting the original message into an equivalent coded message. The number of data of the coded message is accordingly increased with respect to the original message (redundant code) in order to entail a dependence between the data of the coded message. This dependence makes it possible as a function of the message to reconstitute the real value of an erroneous data item or to reconstitute a missing data item. This is what we shall call transmission by coding.

The two aforementioned forms of transmission make use of channels in parallel in order that the redundancy may compensate for their poor individual quality on condition that a decoding rule makes it possible to utilize this redundancy.

A bit by bit decoding rule having maximum likelihood is known (C.R.P. Hartmann and L.D. Rudolph, "An Optimum Symbol-by Symbol Decoding Rule for Linear Codes", IEEE Transactions on Information Theory, Vol. IT-22, pages 514–517) September 76) as well as non-optimum but more simple rules (G. Battail and M. Decouvelaere, Decodage Par repliques Annales des Telecom; Vol. 31, pages 387 to 404, No. 11–12, November–December 76 also included in: G. Battail, M. Decouvelaere & P. Godlewski, "Replication decoding", *IEEE Trans. Infor. Th.* vol. IT-25, pages 332–345, May 1979).

In the case of transmission via n channels in parallel having characteristics which are not known, the decision rules of the decoding methods described in the references cited in the foregoing are not directly applicable. When the characteristics of the channels are stationary or slowly variable, the device according to the invention makes it possible to determine the likelihood of data, thus making up for the initial absence of knowledge of the characteristics of the channels.

According to the invention, there is provided a binary decoding device for decoding bits of a message, said bits being received from a group of n channels $C_i$ (n being a positive whole number, i being a whole number which varies from 1 to n, each binary data of said message being either transmitted simultaneously on each of the n channels, or transmitted in a linear code). Said device comprises means for weighting the values of the bits received having n inputs $E_i$ respectively coupled to the n channels $C_i$, n inputs $e_i$ and n outputs $S_i$. A device is provided for weighted decoding of each of the bits received having n inputs coupled respectively to the n outputs $S_i$ of the weighting means and m outputs $r_j$ (m being a positive whole number, j being a whole number which varies from 1 to m) for delivering respectively m relative quantities $A_{jt}$ at the instant t. The sign and the modulus of each quantity $A_{jt}$ represent respectively a binary value which has been transmitted with the highest probability and the coefficient of logarithmic likelihood of said value. Means are further provided for calculating the error probability in the case of each of the channels $C_i$ by comparing each of the bits received with the result of its decoding. Said calculating means have n inputs coupled respectively to the n channels $C_i$, m additional inputs coupled respectively to the m outputs $r_j$ of the weighted decoding device, and n outputs $V_i$ coupled respectively to the n inputs $e_i$ of the weighting means, said n outputs being intended to deliver the error probability $p_i$ of each channel.

These and other features of the invention will be more apparent on consideration of the following description and accompanying drawings, wherein:

FIG. 1 is an example of one embodiment of the device according to the invention in the case of transmission by repetition;

FIG. 2 is an example of another embodiment of the device according to the invention in the case of transmission by coding.

There are shown in FIG. 1 n terminals $C_i$ corresponding to n channels of a transmission system. Each of the n terminals $C_i$ is connected to the corresponding first input of n multipliers $M_i$ as well as to the corresponding first input $E_i$ of n multipliers $m_i$. Each second input of the multipliers $M_i$ is coupled to the output of a summing network 2 through a calculating device $t_o$. The summing network 2 has n inputs which are connected respectively to the n outputs $S_i$ of the multipliers $m_i$. The n second inputs of said multipliers $m_i$ are coupled respectively to the n outputs of the multipliers $M_i$ through an additional calculating device $L_i$ in series with an auxiliary calculating device $X_i$. A terminal 10 is coupled to the output of the summing network 2.

The assembly formed by the n multipliers $M_i$, the n auxiliary calculating devices $X_i$ and the n calculating devices $t_i$ constitutes probability calculating means 5.

Similarly, the n multipliers $m_i$ and the n additional calculating devices $L_i$ form weighting means 4.

Before describing the operation of this device, it is useful to recall the optimum decision rule (G. Battail and M. Decouvelaere, Annales des Telecom. 31 No 11–12, November–December 76) in the sense of maximum likelihood in the case in which the characteristics of the channels are perfectly known. Consideration will then be given to the case in which the characteristics are unknown, stationary or slowly variable. There will then be described the operation of the device of FIG. 1 (for transmission by repetition) which makes it possible as in the case of the device of FIG. 2 (for transmission by coding) to appreciate the quality of the different channels, to optimize the decision of the binary value received as a function of this evaluation and to perform dynamic matching when the quality of the different channels undergoes a progressive variation.

Should the characteristics of the channels be perfectly known, the error probability $p_i$ can be made available at any moment on the $i^{th}$ channel. The "a priori algebraic value" $a_i$ of the binary symbol derived from the $i^{th}$ channel, namely $b_i$, is defined by the following formula:

$$a_i = s_i \log_e \frac{1 - p_i}{p_i}, \quad 0 < p_i \leq \tfrac{1}{2} \qquad (1)$$

where $s_i$ is the sign associated with $b_i$ in accordance with the convention:

$$s_i = (-1)^{b_i}, \text{ whence } b_i = \frac{1-1\cdot s_i}{2}, \text{ with } b_i = 0 \text{ or } b_i = 1 \quad (2)$$

Accordingly, the optimum decision rule in the sense of maximum likelihood makes it possible to obtain the most likely binary value b by means of the following formula:

$$b = \frac{1-1\cdot S}{2}, \text{ with } S \text{ sign of } A = \sum_{i=1}^{n} a_i \quad (3)$$

A is designated as the "a posteriori relative algebraic value".

Furthermore, the error probability p of this decision is given by:

$$p = 1/(1+\exp|A|). \quad (4)$$

In the case in which the characteristics of the channels are unknown, stationary or slowly variable, the exact value of the error probability of each channel is not known.

It is possible, however, to obtain an estimation $\hat{p}_i$ of said value. The optimum decision rule can be applied by substituting $\hat{a}_i$ for $a_i$ in formula (3) and by substituting $\hat{p}_i$ for $p_i$ in formula (1). It is readily apparent that the result, namely $\hat{A}$, no longer corresponds to the optimum decision but, insofar as the estimations $\hat{p}_i$ are close to the real value, the decision of the binary value $\hat{b}$ can produce a further improvement in the mean error probability over that of the best channel. Furthermore, it may be assumed that the evolution of the error probability of the channels is very slow on the scale of the binary data flow. Improved estimation of the error probability in the case of the $i^{th}$ channel may thus be contemplated: the result of the decision can reasonably be presumed to be better than the bit received at the output of the $i^{th}$ channel. The non-coincidence between the two therefore means in the majority of instances that an error has occurred in this channel. The modulus of the "a posteriori algebraic value" makes it possible in addition to weight the result of the decision according to its likelihood. The ratio of the (weighted) number of these discrepancies or "disagreements" to the total number of bits emitted during a predetermined time interval will provide a fresh evaluation of the mean error probability in the $i^{th}$ channel, namely $\hat{p}_i$, which has every chance of being better than the initial estimation $\hat{p}_i$. In consequence, $p_i$ can be substituted for $p_i$ in the case of each i and the process can be repeated. This estimation usually converges towards the real value $p_i$ of the mean error probability of the channel i. At each characteristic instant (at which a fresh set of bits $b_i$ has just been received), the quantity $\hat{p}_i$ will be calculated as an approximate value of $p_i$ determined by the formula established in the following paragraph.

In the case of an agreement between the overall decision and the symbol received on the $i^{th}$ channel, an error in this channel is possible only if the decision is erroneous, that is, with the probability p given by (4) if the initial weightings are accurate. In the event of disagreement, the error in the channel takes place if the decision is correct, that is to say with the probability $1-p$.

The mean error probability in the $i^{th}$ channel can then be expressed by the following mathematical expectation:

$$p_i = E\{\tfrac{1}{2}[(1+s_iS)p+(1-s_iS)(1-p)]\} = \tfrac{1}{2}E[1-s_iS(1-2p)],$$

where S is the sign of A and p is given by (4). According to (4), $S(1-2p)$ can be defined as follows:

$$S(1-2p) = S(\exp|A|-1)/(\exp|A|+1) = \text{th}(A/2);$$

$p_i$ and $a_i$ can accordingly be expressed by the following formulae:

$$p_i = \tfrac{1}{2}E[1-s_i\text{th}(A/2)] = \tfrac{1}{2} - \left[E\frac{s_i\text{th}(A/2)}{2}\right];$$

$$a_i = s_i \log \frac{1-p_i}{p_i}$$

At each characteristic instant t, the estimation $\hat{p}_{it}$ of $p_i$ will naturally be obtained by substituting a mean time value for the mathematical expectation. The mean value will be taken from the p last characteristic instants which have elapsed. As the value of p becomes greater, so the statistical fluctuations in the calculation of $\hat{p}_{it}$ will be smaller, but so the evolution of the algorithm will be slower.

In consequence, let $s_{it}$ be the sign associated in the $i^{th}$ channel with the binary symbol transmitted at the instant t, and $A_t$ be the "a posteriori algebraic value" obtained at this instant. If we now set:

$$\hat{m}_{it} = \frac{1}{p} \sum_{u=t-p+1}^{t} s_{iu}\text{th}(A_u/2) \neq E[s_i\text{th}(A/2)] \quad (5)$$

we shall have the formula which gives $\hat{p}_i$:

$$\hat{p}_i = \tfrac{1}{2} - \frac{\hat{m}_{it}}{2}$$

The operation of the device shown in FIG. 1 is as follows:

At one given instant t, there is received on each terminal $C_i$ a value $s_{it}$ (associated with a bit $b_i$ according to the convention (2)) which corresponds to transmission of a binary data item in parallel by all the n channels considered. These values $s_{it}$ received on each terminal $C_i$ are multiplied by multipliers $m_i$ with coefficients of probability obtained at the output of the calculating devices $L_i$ and having given initial values. Each output $S_i$ of the multipliers $m_i$ delivers the "a priori algebraic value" $a_i$ of the bit derived from the $i^{th}$ channel. The summing network 2 adds the n values $a_i$ and delivers the "a posteriori algebraic value" A (formula (3)). The sign of A represents the most likely binary value emitted and its modulus represents the logarithmic coefficient of this value. The calculating device $t_o$ calculates the hyperbolic tangent of A/2 and this value is multiplied with each value $s_{it}$ by the multipliers $M_i$; each calculating device $X_i$ calculates $\hat{p}_i$ according to formulae (5) and (6); these values $\hat{p}_i$ are then utilized by the calculating devices $L_i$ in order to calculate the new coefficients of probability $$\text{Log}_e \frac{1-p_i}{p_i}$$

which will have to be multiplied at the values $s_{it}$ received at the following instant t'. The process thus described will begin again in the case of new values $S_{it}$ received.

The values of A corresponding to the different instants of reception of a binary value are obtained on the terminal 10. It is only necessary to determine the sign S of this value in order to obtain the most likely value of the bit transmitted, by means of the formula:

$$b = \frac{1 - 1 \cdot S}{2}$$

The invention is not limited to the embodiment hereinabove described and illustrated.

In particular, the device can be applied in a general sense to any other device for decoding binary data of a message transmitted in a block code.

One exemplified embodiment of a device of this type in the case of transmission by coding is illustrated in FIG. 2.

In this figure, the elements of FIG. 1 are again shown except for the calculating device $t_o$ and the summing network 2 which have been replaced by a weighted decoding device 1 having n inputs connected respectively to the n outputs of the multipliers $m_i$ and having n outputs $r_i$ coupled respectively to n calculating devices $t_i$. The outputs of these calculating devices $t_i$ are connected respectively to the second inputs of the multipliers $M_i$. In addition, the n outputs $r_i$ of the weighted decoding device 1 are connected respectively to n output terminals $B_i$.

The principle of operation of this device is identical with that of FIG. 1. Only the optimum decision rule which makes it possible to obtain the most likely binary value $b_i$ has been changed.

This value $b_i$ is determined by the following formula:

$$b_i = \frac{1 - 1 \cdot S_i}{2},$$

with $S_i$ as the sign of $$A_{it} = a_{it} + F_i(a_{1t}, \ldots, a_{i-1,t}, a_{i+1,t}, \ldots, a_{nt})$$

where $A_{it}$ or "a posteriori algebraic value" is dependent on the channel since the emitted binary data differ from one channel to another (block coding), and where $F_i$($a_{1t}, \ldots, a_{i-1,t}, a_{i+1,t}, \ldots, a_{nt}$) is not dependent on $a_{it}$; this is a function deduced from a control matrix of the code employed (G. Battail and M. Decouvelaere, Annales des Telecom 31, No 11-12 November–December 76). The values $A_{it}$ are obtained on each of the n terminals $B_i$.

It is worthy of note that the auxiliary calculating devices $X_i$ can calculate $\hat{p}_i$ by calculating a mean time value other than that obtained by means of formula (5). In fact, other methods of weighting of the values present at prior instants are possible; for example, $\hat{m}_{it}$ can be calculated by means of the following formula:

$$\hat{m}_{it} = (1-\tau)\hat{m}_{i,t-1} + \tau s_{it} th(A_t/2).$$

The embodiment of the device illustrated in FIG. 2, and above described, can be applied to the decoding of any other type of linear code, in particular recurrent codes.

As a typical example, this decoder device can be used at the end of a radio transmission system using ionospheric propagation. The use of several subcarriers is a means for increasing the information rate but multipath propagation causes selective fading so that channels have an inconstant reliability. In these conditions the device of the invention estimates weighting coefficients following the variations of the reliability of the channels.

What is claimed is:

1. A binary decoding device for decoding bits of a message, said bits being received from a group of n channels $C_i$ (n being a positive whole number, i being a whole number which varies from 1 to n, each binary data of said message being either transmitted simultaneously on each of the n channels, or transmitted in a linear code), comprising means for weighting the values of the bits received having n inputs $E_i$ coupled respectively to the n channels $C_i$, n inputs $e_i$ and n outputs $S_i$; a device for weighted decoding of each of the bits received having n inputs coupled respectively to the n outputs $S_i$ of the weighting means and m outputs $r_j$ (m being a positive whole number, j being a whole number which varies from 1 to m) for delivering respectively m relative quantities $A_{jt}$ at the instant t, the sign and the modulus of each quantity $A_{jt}$ being such as to represent respectively a binary value which has been transmitted with the highest probability and the coefficient of logarithmic likelihood of said value; means for calculating the probability of error in the case of each of the channels $C_i$ by comparing each of the bits received with the result of its decoding, said calculating means being provided with n inputs coupled respectively to the n channels $C_i$, m additional inputs coupled respectively to the m outputs $r_j$ of the weighted decoding device, and n outputs $V_i$ coupled respectively to the n inputs $e_i$ of the weighting means, said n outputs being intended to deliver the probability error $p_i$ of each channel.

2. A binary decoding device according to claim 1 in which each channel $C_i$ delivers a value $S_i$ associated with the value of the received bit $b_i$ by means of the convention $S_i = (-1)^{b_i}$, wherein m is equal to n, wherein means for calculating the error probability comprise n multipliers $M_i$ each having a first input, a second input, and an output, the n multipliers $M_i$ being coupled respectively through their first input to the n channels $C_i$; n calculating devices $t_i$ for calculating the hyperbolic tangent of one-half of the value which is present on their input, each calculating device being provided with one input and one output, the input and the output of the $i^{th}$ calculating device being coupled in the case of any value of i respectively to the $i^{th}$ output of the weighted decoding device and to the second input of the $i^{th}$ multiplier $M_i$; and n auxiliary calculating devices $X_i$ for evaluating the error probability $p_i = \frac{1}{2}(1 - m_{it})$ of each channel, ($m_{it}$ being a mean time value of the values received on the input of the $i^{th}$ auxiliary calculating device), said n auxiliary calculating devices $X_i$ being intended respectively to couple the n multipliers $M_i$ through their outputs to the inputs $e_i$ of the weighting means, and wherein the weighting means comprise n multipliers $m_i$ each having a first input, a second input and an output, the first input and the output of the $i^{th}$ multiplier $m_i$ being coupled respectively in the case of any value of i to the $i^{th}$ channel $C_i$ and to the $i^{th}$ input of the weighted decoding device; and n additional calculating devices $L_i$ for calculating respectively the values of the logarithm of $$\frac{1-p_i}{p_i},$$

the output of the $i^{th}$ auxiliary calculating device $x_i$ being coupled to the second input of the $i^{th}$ multiplier $m_i$ through the $i^{th}$ additional calculating device $L_i$ in the case of any value of i.

3. A binary decoding device according to claim 1 in which each binary data item of the message is transmitted simultaneously on each of the n channels, wherein m is equal to 1, and wherein the weighted decoding device is a summing network having n inputs coupled respectively to the n outputs $S_i$ of the weighting means, and an output for delivering the quantity $A_{it}$, the sign of which represents the most likely binary value transmitted and the modulus of which represents the coefficient of logarithmic likelihood of said value.

4. A binary decoding device according to claim 3 in which each channel $C_i$ delivers a value $s_i$ associated with the value of the received bit $b_i$ by virtue of the convention $s_i = (-1)^{b_i}$, wherein the probability calculation means comprise n multipliers $M_i$ each having a first input, a second input and an output, said n multipliers $M_i$ being coupled through their first input respectively to the n channels $C_i$; a calculating device having one output coupled to each of the second inputs of the multipliers $M_i$ and one input coupled to the output of the summing network, said calculating device being intended to calculate the hyperbolic tangent of one-half of the value which is present on its input; and n auxiliary calculating devices $X_i$ for evaluating the error probability $p_i = \frac{1}{2}(1 - m_{it})$ of each channel ($m_{it}$ being a mean time value of the values received on the input of the $i^{th}$ auxiliary calculating device), the output of the $i^{th}$ multiplier $M_i$ being coupled in the case of any value of i to the $i^{th}$ input of the weighting means through the $i^{th}$ auxiliary calculating device $X_i$, and wherein the weighting means comprise n auxiliary multipliers $m_i$ each having a first input, a second input, and an output, the first input and the output of the $i^{th}$ multiplier $m_i$ being coupled in the case of the entire value of i respectively to the $i^{th}$ channel $C_i$ and to the $i^{th}$ of the summing network; and n additional calculating devices $L_i$ for calculating the logarithm of $$\frac{1-p_i}{p_i},$$

the output of the $i^{th}$ auxiliary calculating device $X_i$ being coupled in the case of any value of i to the second input of the $i^{th}$ multiplier $m_i$ through the $i^{th}$ additional calculating device $L_i$.

* * * * *